Dec. 2, 1924.
L. G. HALL
COMBINATION LAND AND WATER VEHICLE
Filed Aug. 5, 1922
1,517,422
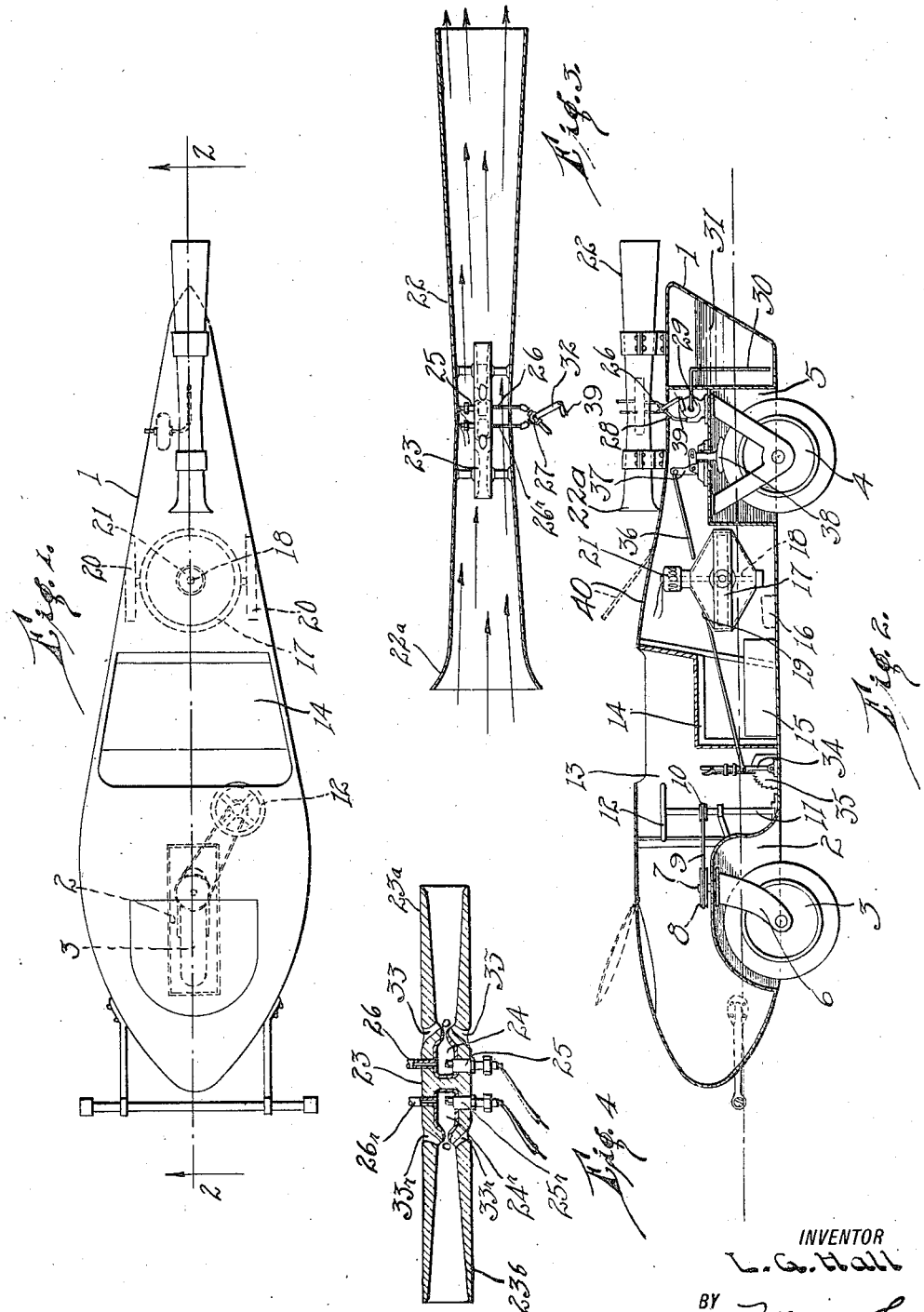
INVENTOR
L. G. Hall
BY Munn & Co.
ATTORNEYS Patented Dec. 2, 1924.

1,517,422

UNITED STATES PATENT OFFICE.

LEO G. HALL, OF DOWNERS GROVE, ILLINOIS.

COMBINATION LAND AND WATER VEHICLE.

Application filed August 5, 1922. Serial No. 579,822.

*To all whom it may concern:*

Be it known that I, LEO G. HALL, a citizen of the United States, and a resident of Downers Grove, in the county of Du Page and State of Illinois, have invented a new and useful Improvement in Combination Land and Water Vehicles, of which the following is a full, clear, and exact description.

My invention relates to improvements in a combination land and water vehicle, and it consists in the combinations, constructions and advantages herein described and claimed.

An object of my invention is to provide a device in the form of a transportation unit primarily resembling an automobile, but also capable, without any adjustment whatever, of driving off the land into the water and serving as a power boat.

A further object of my invention is to provide a device of the type described, which requires a minimum of power for its propulsion, owing to several important factors which contribute to the elimination of power absorbing features which are found on the ordinary automotive vehicle.

A further object of my invention is to provide a device of the type described, which dispenses with the necessity of the ordinary engine, thereby reducing weight and the liability of such engine to get out of order.

A further object of the invention is to provide a device of the type described, which obviates the necessity of a differential, thus further reducing the complicated mechanism which is found in the ordinary automobile.

A further object of the invention is to provide a device in which the propelling means can be used as efficiently in the water as on the land, without any change whatever, so that there is no necessity of any adjustment when the vehicle is entering the water from the land.

A further object of my invention is to provide a device of the type described, having a front wheel which serves to support the vehicle when used on land, but which serves as a rudder when used in the water.

A further object of my invention is to provide a vehicle of the type described, in which a gyroscope is used to stabilize the machine, so as to permit the use of two wheels, thereby making the vehicle available for use on narrow paths which a four-wheel vehicle could not take.

Other objects and advantages will appear in the following specification, and the novel features of the invention will be particularly pointed out in the appended claims.

My invention is illustrated in the accompanying drawings, forming part of this application, in which—

Figure 1 is a plan view of the device,

Figure 2 is a central longitudinal section along the line 2—2 of Figure 1,

Figure 3 is a central vertical section through a portion of the propelling means, and Figure 4 is a detailed section through the burner of the propelling means.

In carrying out my invention, I provide a frame 1 which may be made of any suitable material, this frame being fashioned along the stream lines, as shown in the drawings. At 2 I have shown a recess in the bottom of the frame, in which is disposed a front wheel 3. The rear wheel 4 is disposed in a recess 5 in the rear of the frame. The walls of these recesses are made water tight, so that the frame 1 of the vehicle may be used as a boat when it is desired to enter the water.

The front wheel 3 is supported in any suitable manner, as in a fork 6, having a stub shaft 7 which projects through the wall of the recess 2 and which is provided with a bull wheel 8, which is connected by a band 9 with a pulley 10 on the shaft 11 of the steering wheel 12. This construction permits the steering of the vehicle on land, and it also permits the steering of the vehicle in the water, the wheel 3 serving as a rudder. To this end it is made of uniform thickness.

In the drawings I have shown a cock pit 13, having a seat 14. Underneath the seat there is a storage battery 15 and a coil 16. A gyroscope 17 is mounted on a vertical axis 18, journaled in a casing 19 which is mounted on brackets 20 to turn on a horizontal axis. The gyroscope is driven by a motor 21, which may be run from the storage battery 15.

The propelling means includes a large tube 22 which is opened at both ends. It will be noted that the rear end of this tube gradually expands on a straight taper. The front end also tapers and is provided with a flared portion 22ª at its mouth. Inside of the tube 22 are the burners. These may be made as shown in Figure 4, in which a body portion 23 is provided with a pair of ignition chambers 24 and 24ʳ respectively. A spark plug 25 is provided for the chamber 24 and a similar plug 25ʳ for the chamber 24ʳ. The fuel and air inlet pipe 26 leads to a 3-way cock 27, having communication by means of a pipe 28 with a mixer and force pump 29. The latter has a pipe 30 which extends to the bottom of the fuel tank 31. The pump 29 is designed to draw fuel from the tank to mix it with air and to project the mixture into the chamber 24 or 24ʳ, according as the lever 32 is positioned, to admit the fuel into the pipe 26, or into the pipe 26ʳ.

It will be observed that the body portion 23 is prepared with a laterally extending tube 23ª and also with an oppositely extending tube 23ᵇ. The tube 23ª is provided with air openings 33 and the tube 23ᵇ has air openings 33ʳ. In Figure 2, I have shown a brake lever 34, having a locking segment 35. A brake rod 36 extends to a lever 37 which controls a brake shoe 38 on the rear wheel.

From the foregoing description of the various parts of the device, the operation thereof will be readily understood. In starting the device, the gyroscope is set in motion by switching on the current with the motor 21 and the pump 29, which is also driven by any suitable means, as through a connection with the gyroscope motor (not shown), the 3-way valve 27 being set at neutral.

When it is desired to start the device, the arm 32, which controls the 3-way valve 37, is moved by means of a throttle lever (not shown) in convenient reach of the driver, and which is connected with the arm 32 by means of a rod 39. Fuel is thereby admitted into the chamber 24, which chamber is filled with air. By closing a switch on the dash, the spark plug 25 is caused to operate. The plugs 25 and 25ʳ are both connected with the coil 16, so that upon closing the proper circuit, the spark is caused to ignite the mixture in the chamber 24. The products of combustion are accelerated rearwardly with great force through the tube 23ª and thence into the larger tube 22 and on out at the rear end. The reaction of the rearwardly moving products of combustion and the air which is entrained causes a forward thrust, and thus the vehicle is driven. It is only necessary to move the arm 32, so as to let in more or less of the fuel, to cause a greater or less speed of the vehicle.

When it is desired to reverse the travel, the arm 32 is swung so as to cut off the fuel from the chamber 24, and to admit it into the chamber 24ʳ, where it is ignited in the manner described. The forward acceleration of the products of combustion will cause a rearward thrust, and the vehicle will move rearwardly.

As stated above, the casing 1 is water tight, and the device works equally as well in the water as it does on land. The steering wheel 3 is used as a rudder. The use of two wheels, instead of 4, has several advantages. In the first place, it lightens the weight, reduces the cost and provides a vehicle which can make use of narrow paths or trails which a four-wheel vehicle would be unable to travel. The use of the gyroscope tends to prevent the overturning of the vehicle, even if it should leave the road. A two-wheel vehicle is more easily steered than the four-wheel vehicle. The making of the body on stream lines further cuts down the head resistance. The propelling device, as stated, obviates the necessity of an engine with its complicated parts, which are liable to get out of order, and this further cuts down the weight of the device.

When the device is in the water, the propelling means is just as efficient as on land, so that one can go from the land immediately into the water without any change at all, or any adjustment. The elimination of the differential is also one of the features. It will be noted that the two-wheel vehicle, besides being lighter, on account of the elimination of extra wheels and axles, also obviates the necessity of a differential.

In Figure 2 of the drawings, I have shown a hinged deflector 40, which is disposed just in front of the flared inlet 22ª, and which serves, when raised to the dotted line position, where it may be held by any suitable means, to deflect the products of combustion so as to prevent them from coming in immediate contact with the occupant of the vehicle when the vehicle is being propelled rearwardly. As a matter of fact, the products of combustion are rapidly cooled in passing through the tube, so that one would not be seriously inconvenienced if the deflector were not raised. It is, however, a device which will deflect the products of combustion in the manner stated, and it also serves as a door for permitting access to the interior of the casing, where the storage battery and the gyroscope are located.

I am aware that propellers of the fan type have been used to propel automobiles. Ordinarily, however, these propellers have no casing, and as far as I am aware, the driving of a land vehicle by a blast, which is enclosed in a tube which prevents eddy currents and which therefore greatly increases the effective power of the reaction from the blast, has not before been attempted.

I claim:

1. The combination with a land vehicle, of means for propelling the same, said means comprising a tube having a portion of minimum diameter and enlarging toward both ends, a blast projecting device disposed within the tube substantially at the point of minimum diameter and adapted to deliver a blast toward either end of the tube, whereby a reactive thrust may be imparted forwardly or rearwardly.

2. The combination with a land vehicle, of means for propelling the same, said means including a tube open at both ends, a blast projecting device disposed in the tube between the ends, and means for delivering fuel to said blast projecting device and for igniting the fuel.

3. The combination with a land vehicle, of means for propelling the same, said means including a tube open at both ends, a blast projecting device disposed within the tube between the ends and being spaced from the tube, said blast projecting device having a pair of individual ignition chambers, and means for delivering fuel to either chamber at will.

4. The combination of a vehicle having a water tight body, of a pair of wheels disposed in longitudinal alinement, a gyroscope, means for operating the gyroscope to maintain the vehicle in an upright position, and a blast projecting device carried by the body of the vehicle, the axis of the blast projecting device lying in a plane through the axis of the gyroscope.

5. The combination of a vehicle having a water tight body, of a pair of wheels disposed in longitudinal alinement, a gyroscope, means for operating the gyroscope to maintain the vehicle in an upright position, a blast projecting device carried by the body of the vehicle, the axis of the blast projecting device lying in a plane through the axis of the gyroscope, and means for controlling the blast projecting device to cause the vehicle to move rearwardly or forwardly at will.

6. In a combined water and land vehicle, a water tight body portion having a pair of recesses on the under side thereof, a front wheel disposed in one recess and being mounted to turn on the vertical axis, a rear wheel disposed in the other recess, means for stabilizing the vehicle, and a blast projecting device carried by the body and adapted to project a blast forwardly or rearwardly at will, the axis of the blast projecting device being in a plane through the axis of the gyroscope, said blast projecting device being adapted to propel the vehicle either on land or on water, and said front wheel serving as a steering means on land and as a rudder in water.

7. A combination land and water vehicle comprising a water tight body having a pair of recesses on the under side thereof, a front wheel disposed in one recess and adapted to turn on the vertical axis, means for turning the front wheel, a rear wheel disposed in the other recess, a gyroscope, means for operating the gyroscope, and a blast projecting device for causing a forward and rearward reactive thrust, whereby the vehicle may be propelled forwardly or rearwardly on land or on water, the axis of the blast projecting device being in a plane through the axis of the gyroscope.

8. In a combined water and land vehicle, a water tight body portion, wheels carried by said body portion exteriorly thereof, and a device for producing combustion and for projecting a blast of the products of combustion carried by said body portion above the normal water line, said blast projecting device being arranged to project the blast forwardly or rearwardly at will for propelling the vehicle either on land or in water.

9. In a combined water and land vehicle, a water tight body portion, wheels carried by said body portion exteriorly thereof, and a device for producing combustion and for projecting a blast of the products of combustion carried by said body portion above the normal water line, said blast projecting device being arranged to project the blast forwardly or rearwardly at will for propelling the vehicle either on land or in water, one of said wheels serving as a rudder in water.

LEO G. HALL.